Nov. 12, 1957  F. F. HUMPHREYS  2,812,659
SPRING TESTER
Filed July 25, 1955  3 Sheets-Sheet 1

INVENTOR.
FERDINAND F. HUMPHREYS
BY Charles Marks
ATTORNEY

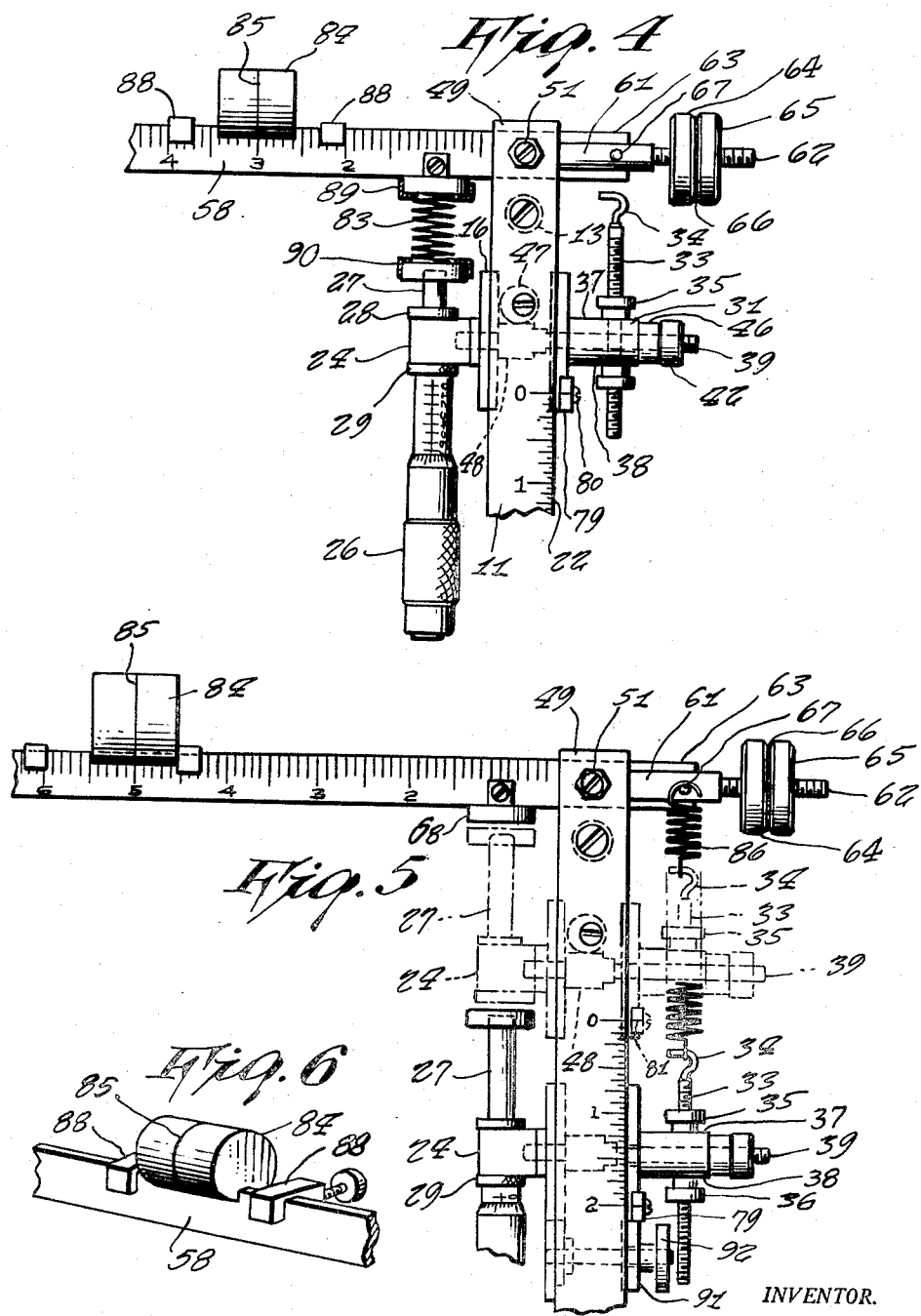

Nov. 12, 1957 F. F. HUMPHREYS 2,812,659
SPRING TESTER

Filed July 25, 1955 3 Sheets-Sheet 3

INVENTOR.
FERDINAND F. HUMPHREYS
BY
Charles Marks
ATTORNEY

United States Patent Office 2,812,659
Patented Nov. 12, 1957

2,812,659
SPRING TESTER
Ferdinand F. Humphreys, Caldwell, N. J.
Application July 25, 1955, Serial No. 524,214
8 Claims. (Cl. 73—161)

This invention falls within the field of force and displacement measuring equipment and, in particular, is related to a device for determining certain force and displacement characteristics of coil and flat springs.

These characteristics, which include the forces exerted by springs at particular deflections, are often of critical importance in the proper application and function of a wide variety of compression, extension and flat springs; and hence it is most desirable to provide a simple, economical and wear-resistant testing unit having convenient means for displacing a spring to a predetermined length and for measuring the force it exerts in such position. Moreover, since springs are frequently produced as precision parts and in substantial quantities, it is advantageous for such a unit to afford a rapid and accurate determination of whether or not the force exerted by a spring having a predetermined deflection is within a desired tolerance; and whether or not the deflection of a spring exerting a predetermined force falls within a desired tolerance.

In the present invention these objects are achieved through the provision of a sensitive testing device, of portable weight and compact size, which is primarily adapted for use with low strength coil compression and extension springs, and flat springs; however, its novel features may be utilized for testing springs of greater strength and of other varieties as well. It employs the combination of a slidable displacement measurement unit with an oscillation-dampened, horizontal scale beam, pivotally retained by vertical standards and adapted to receive slidable weights so as to be capable of exerting a great range of predetermined compressive and tensile loads upon coil compression and extension springs mountable on the sides of said standards, as well as upon flat springs contactable with the aforesaid displacement measurement unit.

Figures 1, 2, 3:
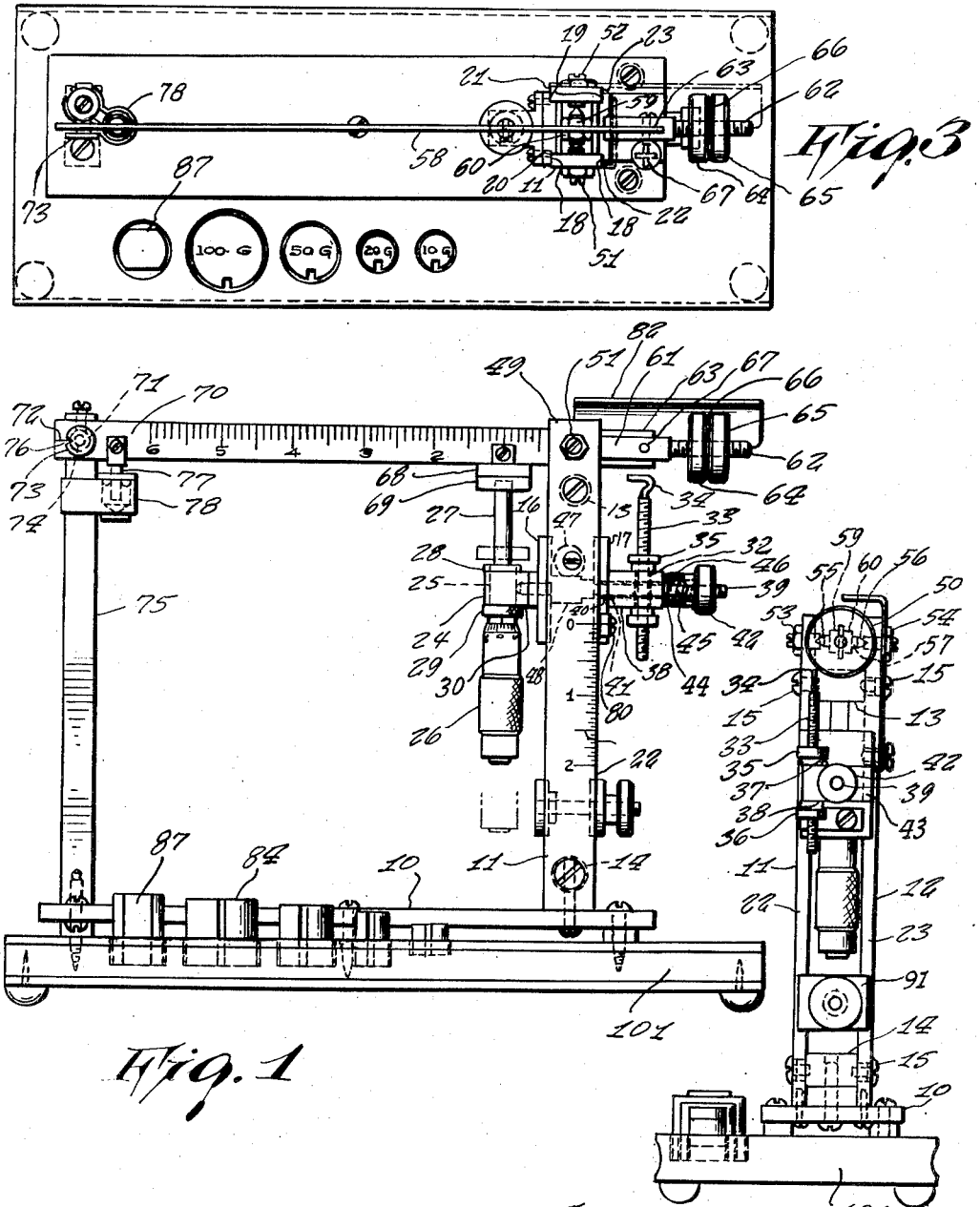
Figure 7:
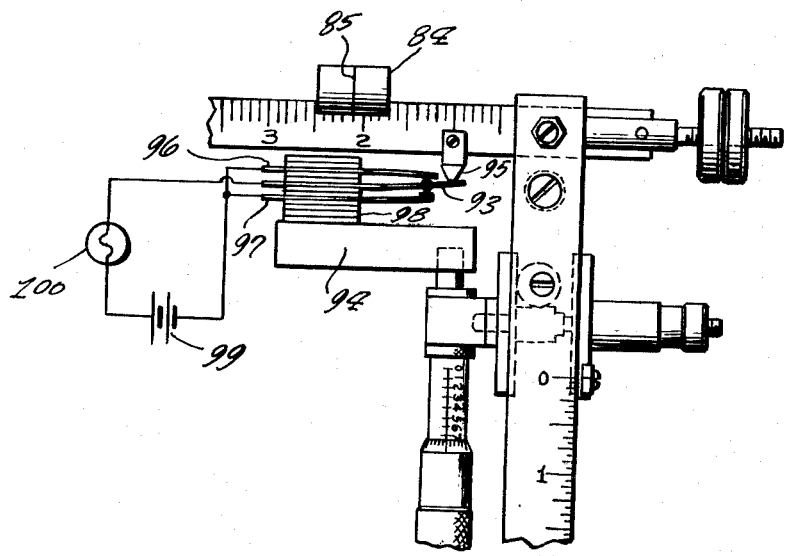

In the accompanying drawings:
Figure 1 is a front elevation of one form of the invention wherein an open position of the measurement unit is shown in dashed and dotted lines.
Figure 2 is a right side elevation of this embodiment of the invention.
Figure 3 is a plan view of this form of the invention.
Figure 4 is a fragmentary front elevation of this arrangement of the invention showing a coil compression spring mounted thereon.
Figure 5 is a fragmentary front elevation of this form of the invention showing a coil extension spring mounted thereon, an extended position of the said spring also being shown in dashed and dotted lines.
Figure 6 is a fragmentary perspective view of the scale beam and a balance weight used in this form of the invention.
Figure 7 is a fragmentary front elevation of another embodiment of the invention showing a flat spring mounted in position for testing thereon.
Similar reference numerals indicate corresponding parts throughout the several views.

As illustrated in Figures 1 to 6 of the drawings, one embodiment of the invention is provided with a horizontal base plate 10 upon which are rigidly affixed a first and second standard 11 and 12 disposed in a parallel spaced relation with respect to each other by upper and lower spacers 13 and 14 affixed between said standards 11 and 12 by suitable screws 15. The standards 11 and 12 are engaged with a vertically adjustable slide assembly which includes a first and second saddle plate 16 and 17, each having two parallel shoulders 18 and 19 in contact with the edge portions 20, 21, 22 and 23 of the standards 11 and 12. On the first saddle plate 16 is affixed a retaining block 24 engaged with the hub 25 of a conventional one inch micrometer head having a thimble 26, spindle 27 and a mounting nut 28. Accidental displacement of the micrometer head thimble 26 is prevented by a lock nut 29 which is contactable with the lower portion 30 of the retaining block 24.

The second saddle plate 17 is secured to a guide block 31 formed with a vertical aperture 32 wherein the shank 33 of a vertically adjustable hook 34 is retained. This shank 33, which is relatively long, is engaged by a pair of knurled thumb nuts 35 and 36 contactable with the upper and lower surfaces 37 and 38 of the guide block 31.

A horizontal stud 39 is secured within the first saddle plate 16 and projects between the standards 11 and 12, and through cylindrical apertures 40 and 41, formed in the second saddle plate 17 and guide block 31, into engagement with a knurled slide assembly adjusting nut 42 contactable with one side portion 43 of the said guide block 31. Since the horizontal stud 39 is closely fitted within the said cylindrical apertures 40 and 41, the saddle plates 16 and 17 cannot undergo any significant vertical movement with respect to each other.

The slide assembly may be positioned by tightening the adjusting nut 42 so as to clamp both saddle plates 16 and 17 in a fixed position upon the standards 11 and 12; it may also be loosened to allow vertical movement of the saddle plates 16 and 17. It is to be noted that when such vertical movement is being accomplished, the saddle plates 16 and 17 are maintained in slidable contact with the standards 11 and 12 by the action of a washer 44 biased by a compression spring 45 against the side portion 43 of the guide block 31, said washer 44 and spring 45 being mounted upon the horizontal stud 39 and retained within one end portion 46 of the adjusting nut 42. This vertical movement of the slide assembly, however, is limited by an eccentric stop 47 mounted between the standards 11 and 12 and contactable with an expanded portion 48 of the aforesaid horizontal stud 39. The eccentric stop 47 may be rotated so as to permit adjustment of the maximum elevation to which the slide assembly may be raised.

At the upper end portions 49 and 50 of the standards 11 and 12 a pair of threadedly mounted ball bearing pivot screws 51 and 52 are secured by a first pair of lock nuts 53 and 54 which affix these screws 51 and 52 in engagement with the conical end portions 55 and 56 of a rotatable, threaded beam pivot 57. This pivot 57 also engages a graduated, horizontal scale beam 58, which is centrally secured upon said pivot 57 by a second pair of lock nuts 59 and 60. The slotted base 61 of a balance stud 62 is affixed to one end portion 63 of the scale beam 58; and a pair of knurled counterweights 64 and 65, separated by a felt washer 66, are threadedly engaged with the said balance stud 62. A horizontal anchoring stud 67 is also secured within the said slotted base 61 at a distance of one inch to the right of the pivot 57 and directly above the vertically adjustable hook 34. The linear scale of the scale beam 58 is graduated in inches, and tenths of an inch, measured from the central axis of the pivot 57; and a first circular anvil 68 is affixed upon the scale beam 58 where it is centered directly below the one inch graduation thereon. This anvil 68 is aligned with a second circular anvil 69 rotatably secured upon the spindle 27 of the aforesaid micrometer head and removable therefrom.

The other end portion 70 of the scale beam 58 is formed with a circular aperture 71 and is marked with a horizontal indicator line 72. A beam balance indicator having a disc 73 and a horizontal shaft 74 integral therewith and projecting through the said circular aperture 71, is suitably mounted upon a third standard 75, which has a cylindrical conformation and which is rigidly affixed to the base plate 10. Since the circular aperture 71 has a greater diameter than that of the horizontal shaft 74 of the beam balance indicator, the end portion 70 of the scale beam 58 is permitted to oscillate in a vertical plane in the vicinity of the said balance indicator. With this arrangement, it is possible to determine whether or not the scale beam 58 is in balance by noting the position of its horizontal indicator line 72 with respect to the apex of a V-notch 76 formed on the side of the disc 73 of the beam balance indicator, the said scale beam 58 being in balance when there is alignment of the said apex with the indicator line 72. Such a determination is facilitated by the oscillation-dampening action of a plunger 77 affixed to the scale beam 58 and engaged with a fluid dashpot 78 suitably mounted upon the third standard 75.

When a zero reading of the slide assembly is desired, the slide assembly and the scale beam 58 must be so related that when the micrometer head is set at zero and the slide assembly is elevated against the eccentric stop 47, the anvils 68 and 69 will be in contact and the indicator line 72 of the scale beam 58 will be in alignment with the apex of the V-notch 76 of the beam balance indicator. This alignment is facilitated by rotational adjustment of the eccentric stop 47 so as to effect variation in the maximum elevation of the slide assembly. A pointer 79, adjustably secured to the second saddle plate 17 of the slide assembly by a screw 80, is then adjusted to align its indicator line 81 with the zero graduation of a vertical, two inch linear scale provided on the first standard 11. This scale is graduated in inches and sixteenths of an inch.

For purposes of protection, a sheet metal guard 82 is mounted upon the second standard 12 and extends at right angles over the end portion 63 of the scale beam 58, thereby reducing the possibility of accidental damage to the balance stud 62, anchoring stud 67, ball bearing pivot screws 51 and 52 and pivot 57.

Operation of the invention may best be understood through a number of specific illustrations. Thus, the determination of the force characteristics of a coil compression spring 83 at a load length of one inch or less may be accomplished as follows: The instrument is first placed on a level working surface and the slide assembly is lowered as far as possible. Then the horizontal scale beam 58 is balanced by suitable adjustment of the counterweights 64 and 65, these being secured in this balanced position by tightening them against the felt washer 66. Thereafter the micrometer head is adjusted to the desired spring load length and maintained in this position by tightening the lock nut 29. The coil compression spring 83 is placed upon the second anvil 69 and the slide assembly is raised so as to bring the horizontal stud 39 into contact with the eccentric stop 47. The slide assembly is then affixed in this position by tightening the adjusting nut 42 and the end portions of the spring 83 are centered upon the anvils 68 and 69.

A slotted cylindrical balance weight 84 is then engaged with the beam 58 and moved along its scale until the beam 58 is in balance. The force exerted by the spring 83 is then determined by multiplying the magnitude of the balance weight 84 by its setting on the beam 58 as shown at the suitably marked mid-portion 85 of the said balance weight 84. A combination of such weights may be placed upon the beam 58, if such are desired to accomplish balance, the spring force then being equal to the sum of the products obtained by multiplying the magnitude of each balance weight by its individual scale setting.

Determination of the force characteristics of an extension spring having a closed length of one inch or less at a load extension of two inches or less may be arrived at with similar facility. As in the instance of the compression spring described above, this determination also contemplates that the instrument be first placed on a level working surface and that the slide assembly be lowered as far as possible. Thereafter the extension spring 86 to be tested should be suspended from the beam 58 by engaging one of its ends with the anchoring stud 67. The beam 58 is then balanced by suitable adjustment of the counterweights 64 and 65, which should be secured in this balanced position by tightening them against the felt washer 66.

When such balance is accomplished, the slide assembly is raised so as to bring the horizontal stud 39 into contact with the eccentric stop 47, the slide assembly then being affixed in this position by tightening the adjusting nut 42. During this part of the operation, clearance should be provided between the anvils 68 and 69 so as to insure freedom of movement for the beam 58.

Thereafter the thumb nuts 35 and 36 are loosened so as to allow the vertically adjustable hook 34 to be engaged with the lower end of the extension spring 86. Then the upper thumb nut 35 is turned down against the upper surface 37 of the guide block 31 so as to exert a pressure just sufficient to relieve the extension spring 86 of the weight of the said vertically adjustable hook 34, thereby keeping the beam 58 in balance; and the lower thumb nut 36 is then tightened against the lower surface 38 of the guide block 31.

The slide assembly is thereafter lowered to the desired spring extension, as indicated on the linear scale of the first standard 11. In this position, the force exerted by the extension spring 86 may be determined through use of the cylindrical balance weights in the same manner as in the case of the coil compression spring described above so as to effect balancing of the beam 58, the spring force being determined by a calculation similar to that used in the case of the said compression spring.

Where it is necessary to determine the force exerted by a compression spring at a load length between one and two inches, an extension block 87, having a length of one inch, is used. The block 87 is placed between the eccentric stop 47 and the horizontal stud 39, the said block 87 also being retained between the first and second standards 11 and 12. Determination of the force characteristics of compression springs in this category is then made in a manner similar to that employed in the case of coil compression springs having a load length of one inch or less, the maximum elevation of the slide assembly, however, being limited by the aforesaid extension block 87.

Where the extension block 87 is used in connection with the determination of the force characteristics of extension springs, it will permit an extension spring load extension of one inch or less, the maximum elevation of the slide assembly, as indicated by the indicator line 81 on the pointer 79, being at the one-inch graduation mark on the linear scale of the first standard 11.

To determine whether or not the force characteristics of a quantity of compression or extension springs is within desired limits for a given load length or extension, tolerance stops 88 may be secured to the beam 58 so as to suitably limit movement of the cylindrical balance weight 84, as shown in Figure 6. The centering of compression springs upon the anvils 68 and 69 may be facilitated by the use of centering cups 89 and 90 affixed to the said anvils 68 and 69, it being noted, however, that when these are used the weight of the first centering cup 89 must be balanced out by suitable adjustment of the counterweights 64 and 65. The weight of the tolerance stops 88 must also be balanced out in a similar manner. In the case of extension springs, a stop 91 may also be adjustably affixed to the first and second standards 11 and 12 by a suitable nut 92, thereby allowing uniform load displacements for such springs to whatever position is determined by the location of the said stop 91.

It is clear from the foregoing force measuring procedure that the load length or displacement of a compression or extension spring for a predetermined force can be arrived at by setting the cylindrical balance weight 84 so as to produce the said predetermined force and then varying the load length or displacement of the compression or extension spring so as to balance the beam 58.

While the above-described embodiment of the invention is primarily designed for determination of the force characteristics of coil springs, another form of the invention can be used for making such determinations in connection with flat springs of various types. This is accomplished by removing the anvils 68 and 69 from the foregoing form of the invention and substituting suitable fittings for supporting and exerting force against the flat spring to be measured. Thus, if it is desired to make force-displacement measurements on a relay contact arm 93, a supporting arm 94 can be engaged with the spindle 27 of the micrometer head and the aforesaid contact arm 93 assembled so as to be contactable with a pointed member 95 affixed below the one-inch graduation of the beam 58 and capable of exerting force upon said relay contact arm 93. Force calculations in such a case, as well as the general force-displacement measurement procedure employed, are similar to that used in connection with compression and extension springs, as described hereinabove.

As shown in Figure 7, it is also practical to make force-displacement measurements on two or more related contact arms 93, 96 and 97, as, for example, in a contact arm pile-up 98. By connecting a battery 99 and lamp 100 to the contact arms 93, 96 and 97, the force and displacement involved in opening or closing two or more arm contact points can be determined by correlating the appropriate forces and displacements with the open and closed conditions of the circuit.

It will be seen that the foregoing forms of the invention provide simple rapid and accurate measurements of the force and displacement characteristics of both coil compression and coil extension springs, as well as for flat springs.

For purposes of convenience, the above-described embodiments of the invention may each be suitably mounted upon a wooden base board 101 having provision for holding the extension block 87 and the plurality of cylindrical balance weights, and enclosed within a suitable carrying case (not shown) removably affixed to said base board 101.

The embodiments of the invention illustrated and described hereinabove have been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

Having thus described my invention, I claim as new and desire to secure by Letters Patent of the United States:

1. An improved spring tester comprising in combination a base, a first and second vertical member mounted upon said base, vertically adjustable means engaged with said first vertical member and laterally supporting an adjustable displacement measurement means, a graduated scale beam pivotally connected with said first vertical member and engageable with at least one movable balance weight, said scale beam also being provided with oscillation-dampening means mounted upon said second vertical member, and means for supporting and compressing a spring specimen between said scale beam and said displacement measurement means, said vertically adjustable means also laterally supporting means for engaging and extending a coil extension spring specimen connectable to projecting means affixed upon said scale beam, said first vertical member also having means for indicating the deflection of said coil extension spring specimen, said first vertical member comprising a first and second standard disposed in a parallel spaced relation with respect to each other, said vertically adjustable means comprising a first and second saddle plate joined by a connecting member and slidably engaged with said first and second standards, the said adjustable displacement measurement means comprising a retaining block mounted upon said first saddle plate and engaged with the hub of a conventional micrometer, the said means for supporting and compressing a spring specimen between said scale beam and said displacement measurement means comprising a first anvil mounted upon the lower portion of said scale beam and a second anvil rotatably mounted upon the spindle of said conventional micrometer, said anvils being in alignment and engageable with a coil compression spring.

2. A device of the type set forth in claim 1, said means for engaging and extending a coil extension spring comprising a horizontal member mounted upon said second saddle plate and retaining an adjustable hook connectable with one end of said coil extension spring, the said projecting means comprising a horizontal anchoring stud, the position of said horizontal member being indicated by a suitably marked pointer adjustably affixed upon the said second saddle plate and located in the vicinity of a linear scale suitably marked upon the said first standard.

3. A device of the type set forth in claim 2, said horizontal member being formed with a vertical aperture wherein the shank of said adjustable hook is retained by a pair of adjustable thumb nuts contactable with the upper and lower surfaces of the said horizontal member.

4. A device of the type set forth in claim 3, said connecting member extending through a horizontal aperture formed in the said horizontal member and having an adjusting nut contactable with a portion of the said horizontal member, the said connecting member also carrying a spring-biased washer contactable with the said horizontal member, the said spring-biased washer being located within one end portion of the said adjusting nut.

5. A device of the type set forth in claim 4, the said first and second standards each having in its upper portion a ball bearing pivot screw connected with the conical end portions of a rotatable, threaded pivot, said pivot being suitably affixed to the said scale beam, the said adjustable displacement measurement means and the said means for engaging and extending a coil extension spring being located on opposite sides of said first and second standards.

6. A device of the type set forth in claim 5, the said first anvil being at a distance of one inch from the central axis of the said pivot, the said anchoring stud also being at a distance of one inch from the said axis, the said scale beam being graduated in inches and tenths of inches.

7. An improved spring tester comprising in combination a base, a first and second vertical member mounted upon said base, vertically adjustable means engaged with said first vertical member and laterally supporting an adjustable displacement measurement means, a graduated scale beam pivotally connected with said first vertical member and engageable with at least one movable balance weight, said scale beam also being provided with oscillation-dampening means mounted upon said second vertical member, and means for deflecting a flat spring specimen supported between said scale beam and said displacement measurement means, said first vertical member comprising a first and second standard disposed in a parallel spaced relation with respect to each other, said vertically adjustable means comprising a first and second saddle plate joined by a connecting member and slidably engaged with said first and second standards, the said adjustable displacement measurement means comprising a retaining block mounted upon said first saddle plate and engaged with the hub of a conventional micrometer, the said means for deflecting a flat spring comprising a pointed member mounted upon the said scale beam and aligned with the said micrometer, the said micrometer also having a horizontal supporting arm mounted upon its spindle, the said supporting arm having an upright portion engageable with the said flat spring, the said flat spring also being contactable with the said pointed member.

8. A device of the type set forth in claim 7, the said pointed member being located at a distance of one inch from the central axis of the said pivotal connection, the said scale beam being graduated in inches and tenths of inches.

References Cited in the file of this patent

UNITED STATES PATENTS

| | | |
|---|---|---|
| 2,164,453 | Gaskins | July 4, 1939 |
| 2,200,348 | Summers | May 14, 1940 |
| 2,458,704 | Hem | Jan. 11, 1949 |